(12) United States Patent
Imura

(10) Patent No.: US 8,872,454 B2
(45) Date of Patent: Oct. 28, 2014

(54) CONTROL UNIT OF ROTARY DEVICE

(75) Inventor: Akihiro Imura, Chita-gun (JP)

(73) Assignee: Denso Corporation, Kariya (JP)

( * ) Notice: Subject to any disclaimer, the term of this patent is extended or adjusted under 35 U.S.C. 154(b) by 173 days.

(21) Appl. No.: 13/470,668

(22) Filed: May 14, 2012

(65) Prior Publication Data

US 2012/0293095 A1    Nov. 22, 2012

(30) Foreign Application Priority Data

May 16, 2011   (JP) ................................. 2011-109184

(51) Int. Cl.
| | |
|---|---|
| H02P 6/12 | (2006.01) |
| H02P 27/08 | (2006.01) |
| H02P 21/06 | (2006.01) |
| H02P 21/00 | (2006.01) |

(52) U.S. Cl.
CPC ................ H02P 27/08 (2013.01); H02P 21/06 (2013.01); H02P 21/0003 (2013.01)
USPC ............ 318/400.15; 318/400.03; 318/400.07; 318/400.09; 318/700

(58) Field of Classification Search
USPC .................. 318/400.3, 400.7, 400.09, 400.15
See application file for complete search history.

(56) References Cited

U.S. PATENT DOCUMENTS

| 7,256,561 | B2 | 8/2007 | Geyer et al. | |
|---|---|---|---|---|
| 2009/0160376 | A1* | 6/2009 | Yamada | 318/400.02 |
| 2009/0160381 | A1* | 6/2009 | Imura et al. | 318/400.15 |
| 2009/0322264 | A1* | 12/2009 | Imura | 318/400.09 |
| 2011/0006711 | A1* | 1/2011 | Imura et al. | 318/400.07 |
| 2011/0031910 | A1* | 2/2011 | Takahashi | 318/400.3 |
| 2011/0050137 | A1* | 3/2011 | Imura et al. | 318/400.15 |
| 2011/0169436 | A1* | 7/2011 | Takahashi et al. | 318/400.3 |

FOREIGN PATENT DOCUMENTS

JP   2008-228419   9/2008

* cited by examiner

Primary Examiner — Eduardo Colon Santana
Assistant Examiner — Bickey Dhakal
(74) Attorney, Agent, or Firm — Nixon & Vanderhye P.C.

(57) ABSTRACT

In a control unit that controls a control amount of a rotary device by controlling on and off states of switching elements of a power converting circuit, a relative rate predicting section temporally sets operation states of the power converting circuit and predicts a relative rate of a control amount according to each of the temporally set operation states relative to a command value thereof. Each of the operation states is indicated by a voltage vector defined by the on and off states of the switching elements. A determining section determines an operation state of the power converting circuit based on the relative rate predicted by the relative rate predicting section. An operating section operates the power converting circuit to the operation state determined by the determining section.

6 Claims, 8 Drawing Sheets

| VOLTAGE VECTOR | SW ELEMENT IN ON-STATE | | |
|---|---|---|---|
| | U-PHASE | V-PHASE | W-PHASE |
| V0 | LOWER | LOWER | LOWER |
| V1 | UPPER | LOWER | LOWER |
| V2 | UPPER | UPPER | LOWER |
| V3 | LOWER | UPPER | LOWER |
| V4 | LOWER | UPPER | UPPER |
| V5 | LOWER | LOWER | UPPER |
| V6 | UPPER | LOWER | UPPER |
| V7 | UPPER | UPPER | UPPER |

US 8,872,454 B2

CONTROL UNIT OF ROTARY DEVICE

CROSS REFERENCE TO RELATED APPLICATION

This application is based on Japanese Patent Application No. 2011-109184 filed on May 16, 2011, the disclosure of which is incorporated herein by reference.

TECHNICAL FIELD

The present disclosure relates to a control unit of a rotary device. More particularly, the present disclosure relates to a control unit that controls a control amount including at least one of an electric current flowing in the rotary device, a torque of the rotary device, a magnetic flux of the rotary device by controlling on and off states of switching elements of a power converting circuit, the switching elements connecting and disconnecting between a voltage applying unit that has multiple different voltage values and terminals of the rotary device.

BACKGROUND

With regard to such a kind of control unit, it has been proposed to perform a model predictive control. For example, according to a model predictive control described in JP2008-228419A, an electric current flowing in a three-phase electric motor is predicted with regard to each of variously set operation states of an inverter, and the inverter is controlled to an operation state where deviation between a predicted electric current and a command current is minimum. Namely, the inverter is controlled to optimize the behavior of electric current predicted based on the operation state of the inverter. Therefore, followability to the command current in a transient time improves. It is considered that such a model predictive control is effectively used in a device requiring high performance as transient followability, such as in a control unit of a motor generator as an in-vehicle main device.

SUMMARY

In a model predictive control, if an operation state of a power converting circuit such as an inverter minimizing deviation of a predictive current and a command current is selected in each time, a switching frequency of the power converting circuit will increase.

It is an object of the present disclosure to provide a new control unit of a rotary device.

According to an aspect, a control unit controls a control amount of a rotary device by controlling on and off states of switching elements of a power converting circuit, the switching elements connecting and disconnecting between a voltage applying unit having multiple different voltage values and terminals of the rotary device. The control amount includes at least one of an electric current flowing in the rotary device, a torque of the rotary device, a magnetic flux of the rotary device. The control unit includes a relative rate predicting section, a determining section, and an operating section. The relative rate predicting section temporarily sets operation states of the power converting circuit, and predicts a relative rate of the control amount according to each of the temporarily set operation states relative to a command value thereof. Each of the operation states is indicated by a voltage vector defined by the on and off states of the switching elements. The determining section determines an operation state of the power converting circuit based on the relative rate predicted by the relative rate predicting section. The operating section operates the power converting circuit to the operation state determined by the determining section.

As the relative rate increases, a time period required to largely separate the control amount from the command value reduces. Further, a time period required to change the operation state so as to solve such a situation reduces. In the above control unit, since the relative rate is used, the operation state is determined while evaluating the operation state where a time period required to largely separate the control value from the command value at a higher evaluation rate, resulting in a decrease in switching frequency of the on and off states of the switching elements.

BRIEF DESCRIPTION OF THE DRAWINGS

The above and other objects, features and advantages of the present disclosure will become more apparent from the following detailed description made with reference to the accompanying drawings, in which like parts are designated by like reference symbols and in which.

DETAILED DESCRIPTION

First Embodiment

A first embodiment of the present disclosure will be hereinafter described with reference to FIGS. 1 through 7. In the first embodiment, a control unit for a rotary device is exemplarily employed to a control unit of a motor generator of a hybrid vehicle.

Figure 1:
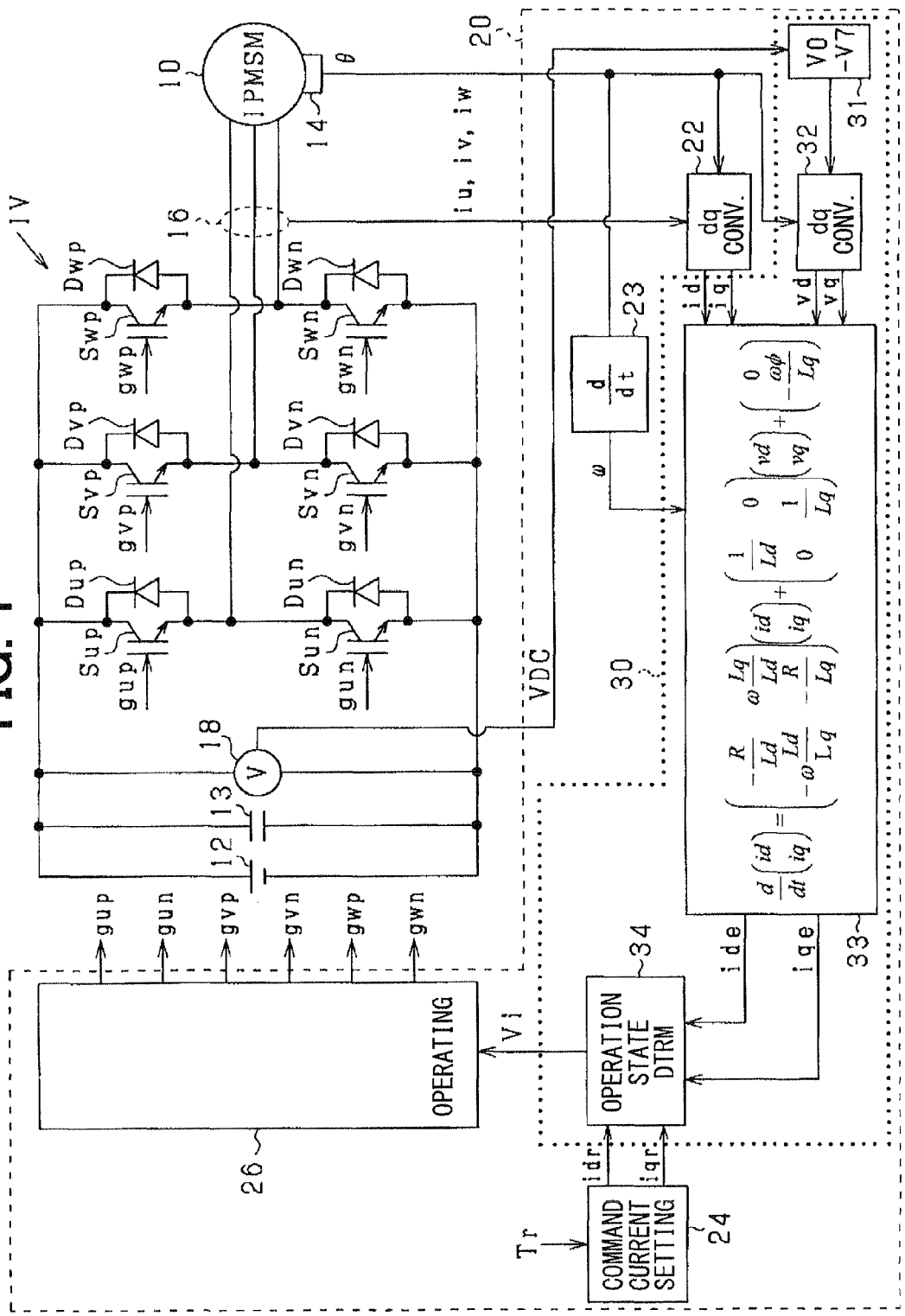
FIG. 1 is a diagram illustrating a system structure of a control unit of a motor generator according to a first embodiment.

Referring to FIG. 1, a motor generator 10 is a three-phase permanent magnet synchronous motor and is used as an in-vehicle main device. Also, the motor generator 10 is a rotary device (i.e., salient pole machine) having saliency. For example, the motor generator 10 is an interior permanent magnet synchronous motor (IPMSM).

The motor generator 10 is connected to a high voltage battery 12 as an example of a DC power supply through an inverter IV. The inverter IV includes three series connection circuits each having a switching element S*p and a switching element S*n (*=u, v, w). A connection point between the switching element S*p and the switching element S*n of each of the series connection circuits is connected to corresponding one of a U-phase, a V-phase and a W-phase of the motor generator 10. As an example of the switching element S*# (*=u, v, w; #=p, n), an insulated gate bipolar transistor (IGBT) is used. A diode D*# is connected to each of the switching elements S*# in an anti-parallel manner.

In the present embodiment, various sensors, such as a rotation angle sensor 14, a current sensor 16 and a voltage sensor 18, are employed as detectors for detecting states of the motor generator 10 and the inverter IV. The rotation angle sensor 14 detects a rotation angle (electrical angle θ) of the motor generator 10. The current sensor 16 detects electric currents (phase currents) iu, iv, iw flowing in the U-phase, the V-phase and the W-phase of the motor generator 10. The voltage sensor 18 detects an input voltage (power supply voltage VDC) of the inverter IV.

Detection values of the above-described sensors are provided to a control unit 20 constituting a low-voltage system through an interface (not shown). The control unit 20 generates an operation signal for operating the inverter IV based on the detection values. For example, an operation signal for operating the switching element S*# of the inverter IV corresponds to the operation signal g*#.

The control unit 20 controls the inverter IV so that the torque of the motor generator 10 is controlled to a required torque Tr. Specifically, the control unit 20 controls the inverter IV so that a command current for realizing the required torque Tr and an electric current flowing in the motor generator 10 coincide with each other. In other words, in the present embodiment, the torque of the motor generator 10 is an ultimate control amount, and the control unit 20 controls the electric current flowing in the motor generator 10 as a direct control amount to coincide with the command current so as to control the torque of the motor generator 10.

In order to control the electric current flowing in the motor generator 10 to the command current, the control unit 20 performs a model predictive control. In the model predictive control, the control unit 20 temporarily set operation states of the inverter IV in multiple patterns, and predicts an electric current flowing in the motor generator 10 with regard to each of the temporarily set operation states. Further, the control unit 20 evaluates the temporarily set operation states based on the predicted currents, and determines the operation state evaluated at a high evaluation rate as an actual operation state of the inverter IV.

Specifically, a dq converting section 22 converts the phase currents iu, iv, iw detected by the current sensor 10 into actual currents id, iq of a rotating system of coordinates. A velocity calculating section 23 receives the electrical angle θ detected by the rotation angle sensor 14, and calculates a rotation speed (electrical angular velocity ω) based on the electrical angle θ. A command current setting section 24 receives the required torque Tr, and generates command currents idr, iqr of a dq coordinate system.

A model predictive control section 30 receives the command currents idr, iqr, the actual currents id, iq, and the electrical angle θ. The model predictive control section 30 determines a voltage vector Vi that defines an operation state of the inverter IV based on the received parameters idr, iqr, id, iq, θ. The model predictive control section 30 provides the voltage vector Vi to an operation section 26.

The operating section 26 generates the operation signals g*# based on the voltage vector Vi. The operating section 26 provides the operation signals g*# to the inverter IV.

Figures 2A, 2B:
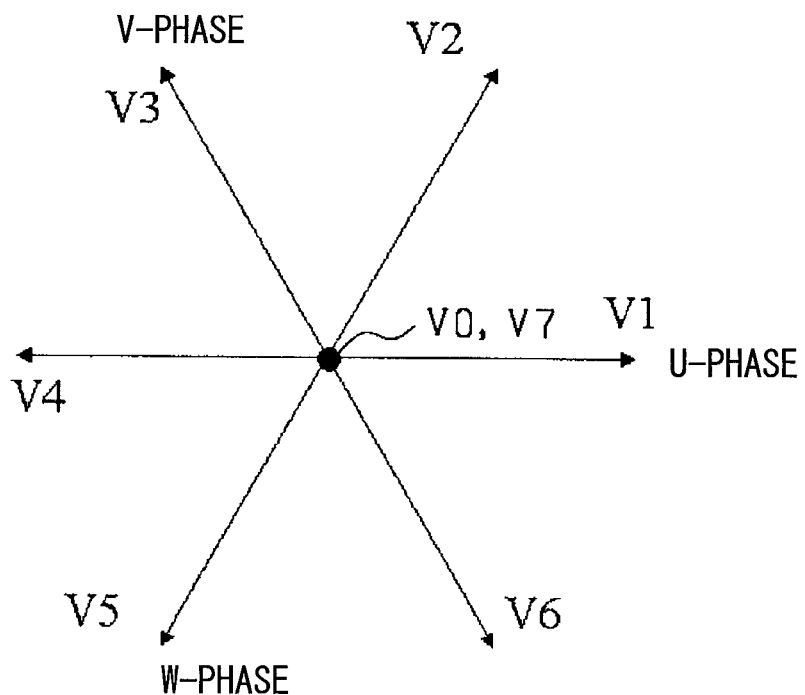
FIGS. 2A and 2B are diagrams illustrating voltage vectors indicating operation states of an inverter according to the first embodiment.

The voltage vector Vi that indicates the operation state of the inverter IV is provided by eight voltage vectors V0-V7 shown in FIGS. 2A and 2B. For example, the voltage vector V0 indicates an operation state where the low-voltage side switching elements Sun, Svn, Swn (e.g., shown as "Lower" in FIG. 2A) are in an on state. The voltage vector V7 indicates an operation state where the high-voltage side switching elements Sup, Svp Swp (e.g., shown as "Upper" in FIG. 2A) are in an on state. The voltage vectors V0, V7 short-circuit all the phases of the motor generator 10. In this case, because the voltage applied to the motor generator 10 from the inverter IV is zero, the voltage vectors V0, V7 are also referred to as zero voltage vectors.

The remaining six voltage vectors V1 to V6 are defined by operation patterns where the switching elements being in an on state exist in both of an upper arm and a lower arm. The voltage vectors V1 to V6 are also referred to as active voltage vectors.

As shown in FIG. 2B, the voltage vectors V1, V3, V5 correspond to the positive side of the U-phase, V-phase and W-phase, respectively.

Next, a process performed by the model predictive control section 30 will be described. An operation state setting section 31 shown in FIG. 1 sets the operation states of the inverter IV. In this case, the operation state setting section 31 sets the voltage vectors V0 to V7 shown in FIG. 2A as the operation states of the inverter IV.

The dq converting section 32 calculates a voltage vector Vdq=(vd, vq) of the dq coordinate system by dq-conversion of the voltage vector set in the operation state setting section 31. In this case, the voltage vectors V0 to V7 set in the operation state setting section 31 are expressed by defining "Upper" and "Lower" in FIG. 2A as "VDC/2" and "−VDC/2", respectively. For example, the voltage vector V0 is expressed as (−VDC/2, −VDC/2, −VDC/2), and the voltage vector V1 is expressed as (VDC/2, −VDC/2. −VDC/2).

A predicting section 33 predicts electric currents id, iq to be generated in a condition where the inverter IV is in the operation state set by the operation state setting section 31, based on the voltage vector (vd, vq), the actual currents id, iq and the electrical angular velocity ω.

The predicting section 33 predicts electric currents of one step ahead by discretizing the following state equations (c3), (c4), which are obtained by solving the following voltage equations (c1), (c2) with regard to a differentiation clause of electric current:

$$vd = (R+pLd)id - \omega Lqiq \tag{c1}$$

$$vq = \omega Ldid + (R+pLq)iq + \omega\phi \tag{c2}$$

$$pid = -(R/Ld)id + \omega(Lq/Ld)iq + vd/Ld \tag{c3}$$

$$piq = -\omega(Ld/Lq)id - (R/Lq)iq + vq/Lq - \omega\phi Lq \tag{c4}$$

In the above equations (c1), (c2), "R" is a resistance, "p" is a differential operator, "Ld" is a d-axis inductance, "Lq" is a q-axis inductance, and φ is an armature constant flux linkage.

The predicting section 33 performs the above current prediction with regard to each of the operation states, which are temporarily set in the multiple patterns by the operation state setting section 31.

An operation state determining section 34 receives the predicted currents ide, iqe predicted by the predicting section 33 and the command currents idr, iqr, and determines the operation state of the inverter IV. The operation section 26 generates the operation signals g*# based on the operation state determined by the operation state determining section 34, and provides the operation signals g*# to the inverter IV.

Figure 3:
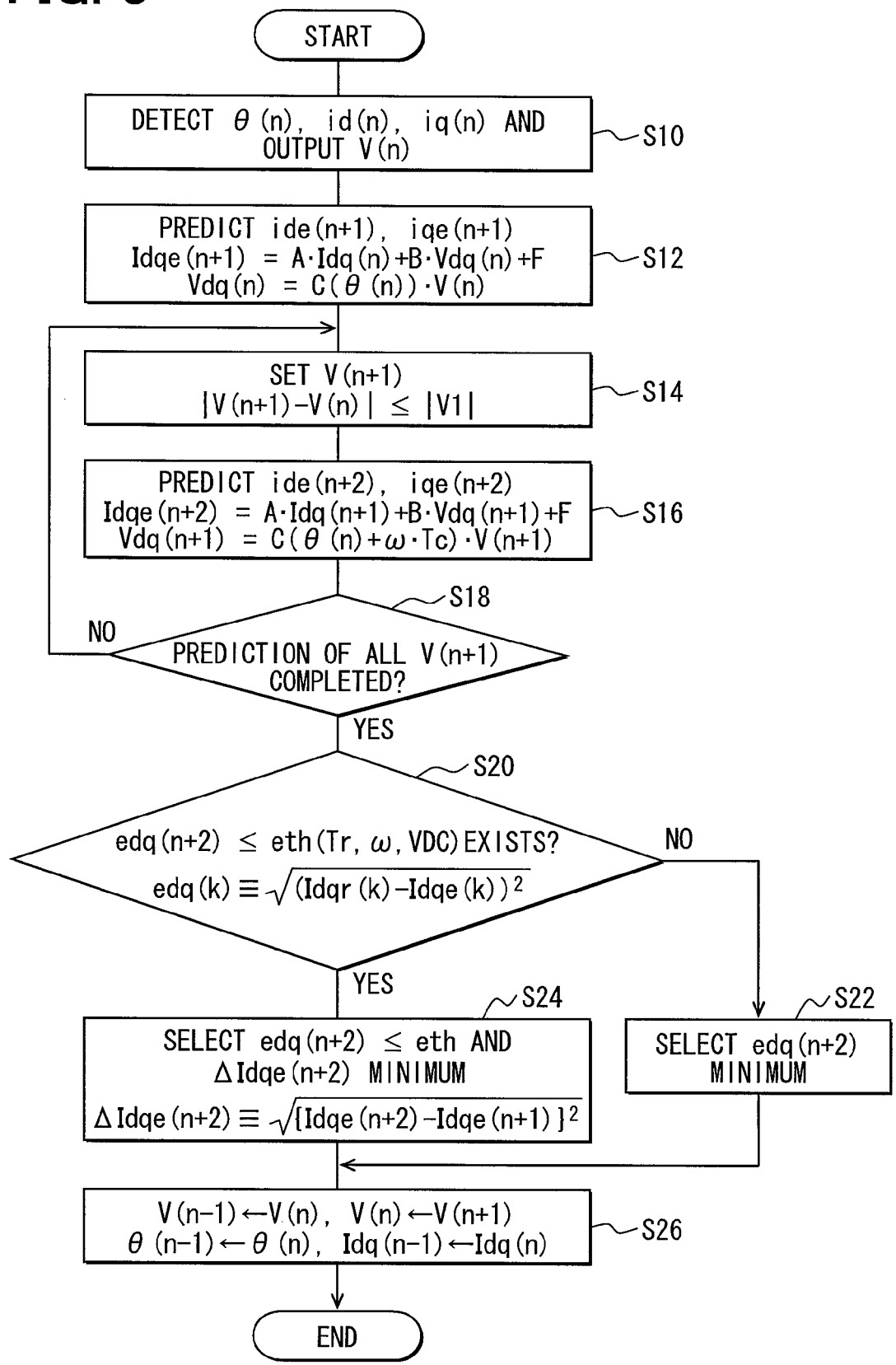
FIG. 3 is a diagram illustrating a flow of a model predictive process performed by the control unit according to the first embodiment.

FIG. 3 is a diagram illustrating the process of the model predictive control of the present embodiment. The process is repeatedly performed with a predetermined cycle (control cycle Tc).

As shown in FIG. 3, at S10, an electrical angle θ(n) and actual electric currents id(n), iq(n) are detected, and a voltage vector V(n) determined in the last control cycle is outputted.

At S12, electric currents (ide(n+1), iqe(n+1)) of one control cycle ahead are predicted. The step of S12 is performed to predict how the electric currents of the one control cycle ahead changes by the voltage vector V(n) outputted at S10. In this case, the electric currents ide(n+1), iqe(n+1) are calculated by discretizing the models expressed by the above equations (c3), (c4) with the control cycle Tc in a forward difference method. In the calculation, the actual electric currents id(n), iq(n) detected at S10 are used as initial values of the electric currents. Also, as the voltage vector on the dq axes, a voltage vector that is provided by a dq-conversion of the voltage vector V(n) with the electrical angle θ(n) detected at S10 is used.

At S14 and S16, electric currents of two control cycles ahead are predicted with regard to a case where a voltage vector that has a switching phase number of a switching state (on and off state) from the operation state indicated by the voltage vector V(n) of the control cycle of this time or equal to or less than "one" is temporarily set as a voltage vector V(n+1) of the next control cycle. Specifically, at S14, the voltage vector V(n+11) is defined as the voltage vector that has the switching phase number of equal to or less than "one" from the operation state indicated by the voltage vector V(n) of the current control cycle. In FIG. 3, a condition where the phase number is equal to or less than "one" is described by replacing "Upper" and "Lower" of FIG. 2A with "1" and "0", respectively.

Figure 4A:
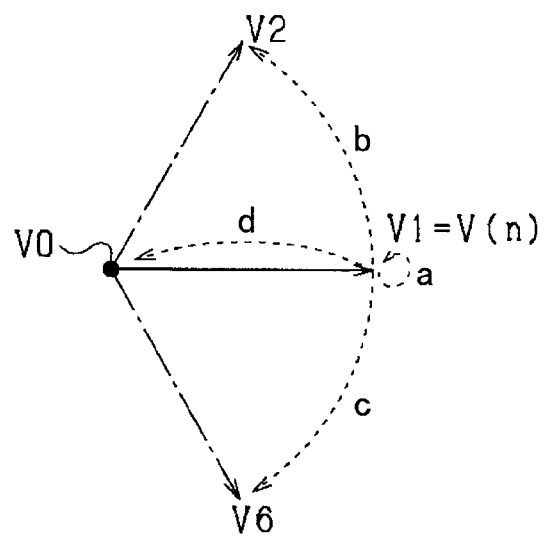
FIGS. 4A through 4C are diagrams illustrating operation states to be temporarily set by the control unit according to the first embodiment.

For example, in a case where the voltage vector V(n) is an active voltage vector Vi (i=1-6), the voltage vector V(n+1) is set to a voltage vector Vi−1, Vi, Vi+1 (i: mod 6), or the zero voltage vector. As the zero voltage vector, when the voltage vector V(n) is V2k (i.e., V(n)=V2k (k=1-3)), the zero voltage vector V7 is selected. When the voltage vector V(n) is V2k−1 (i.e., V(n)=V2k−1), the zero voltage vector V0 is selected. FIG. 4A is a diagram illustrating four voltage vectors that can be temporarily set as the voltage vector V(n+1) in a case where the voltage vector V(n) is V (i.e., V(n)=V1).

Figure 4B:
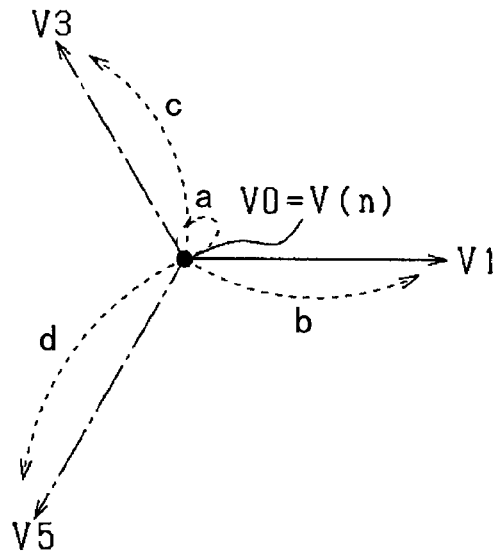
Figure 4C:
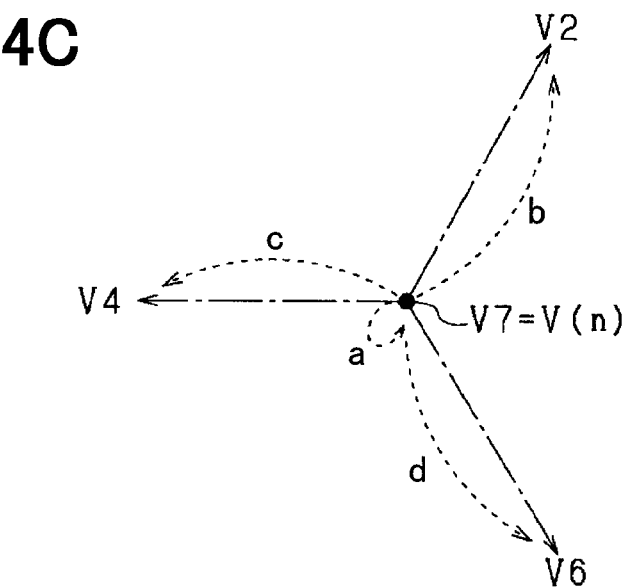

In a case where the current voltage vector V(n) is the zero voltage vector V0, as shown in FIG. 4B, the voltage vector V(n+1) is set to an odd number voltage vector V1, V3, or V5 or the zero voltage vector V0. In a case where the current voltage vector V(n) is the zero voltage vector V7, as shown in FIG. 4C, the voltage vector V(n+1) is set to an even number voltage vector V2, V4, or V6 or the zero voltage vector V7.

At S16, predictive currents ide(n+2), iqe(n+2) are calculated in the similar manner to S12. In this case, the predictive currents ide(n+1), iqe(n+1) calculated at S12 are used as the initial values of the electric current. Also, a voltage vector calculated by the dq-conversion of the voltage vector V(n+1) with a summed angle of the electrical angle θ(n) detected at S10 and crTc is used as a voltage vector on the dq axes.

At S18, it is determined whether the prediction of the electric currents of two control cycles ahead is completed for all the voltage vectors having the switching phase number of equal to or less than "one". When the determination result at S18 is "No", the process returns to S14. In this case, at S14, of the voltage vectors having the switching phase number of equal to or less than "one", the voltage vector that has not been used for the prediction of the electric currents of two control cycles ahead is set to the voltage vector V(n+1).

When the determination result at S18 is "Yes", the process proceeds to S20. At S20, it is determined whether any of four pairs of predictive currents ide(n+2), iqe(n+2) calculated at S16 has a norm of vector difference from the command currents idr, iqr (error edq(n+2)) equal to or less than a threshold value eth.

In this case, the threshold value eth is variable in accordance with the required torque Tr, the electrical angular velocity ω, and the power supply voltage VDC. Namely, the command currents idr, iqr increase with an increase in the required torque Tr. The rate of error with respect to the command currents idr, iqr reduces even if the difference is the same. Therefore, it is determined whether the rate of error with respect to the command currents idr, iqr is excessively large or not by setting the threshold value eth to a larger value with the increase in the required torque Tr.

Considering that the change in the electric current reduces with an increase in the electrical angular velocity ω, the threshold value eth is increased with a decrease in the electrical angular velocity ω to restrict a situation of exceeding the threshold value eth.

Further, considering that the change in the electric current increases with an increase in the power supply voltage VDC, the threshold eth is increased with an increase in the power supply voltage VDC to restrict a situation of exceeding the threshold value eth.

When the determination result at S20 is "No", at S22, the voltage vector that corresponds to the electric currents having the smallest error edq in the four pairs of the predictive currents ide(n+2), iqe(n+2) is selected as the voltage vector indicating the operation state of the next control cycle of the inverter IV. In other words, the voltage vector having the smallest error edq is evaluated at a highest evaluation rate. That is, evaluation increases as the error edq reduces.

When the determination result at S20 is "Yes", the process proceeds to S24. In this case, since any of the four pairs of the predictive currents ide(n+2), iqe(n+2) has the error edq(n+2) equal to or less than the threshold value eth, the voltage vector indicating the operation state of the next control cycle of the inverter IV is selected from the voltage vectors corresponding to the electric currents having the error equal to or less than the threshold value eth.

Specifically, the voltage vector that corresponds to the electric currents having the smallest norm of vector difference (change rate ΔIdqe(n+2)) between the predictive currents ide(n+1), iqe(n+1) of the one control cycle before and the predictive currents ide(n+2), iqe(n+2) is selected as the voltage vector indicating the operation state of the next control cycle of the inverter IV. This step is performed to reduce a switching frequency of the on and off states.

Namely, if the change rate ΔIdqe(n+2) is large, the actual electric currents id, iq largely changes in one control cycle Tc. With this, a time period required to increase the error edq over the threshold value eth reduces. In this case, since the determination result at S20 is "No" and the process proceeds to S22, a possibility of changing the voltage vector and of switching the on and off state increases.

On the other hand, when the rate of change ΔIdqe(n+2) is small, the amount of change of the actual currents id, iq in one control cycle Tc reduces. With this, the time period required until the error edq exceeds the threshold value eth increases, and thus the on and off state is less likely to be changed. This is because a vector indicating the change in the error edq (i.e., a relative rate vector of the predictive currents ide, iqe to the command currents idr, iqr) is indicated by a difference between an average output voltage of the inverter IV (i.e., fundamental voltage) and the current voltage vector.

Namely, in this case, in a stationary state where the change in the command currents idr, iqr is small, a probability that the same voltage vector is evaluated as the voltage vector that makes the relative rate minimum increases. Further, in the stationary state, since the relative rate and the change rate ΔIdqe(n+2) have a proportional relationship therebetween, a probability where the same voltage vector is evaluated as the voltage vector that makes the change rate ΔIdqe(n+2) minimum increases.

After the completion of S22 or S24, the process proceeds to S26. At S26, the voltage vectors V(n), V(n+1) are respectively set to voltage vectors V(n−1), V(n), and the electrical angle θ(n) is set to an electrical angle θ(n−1). Also, the actual electric currents id(n), iq(n) are respectively set to actual electric currents id(n−1), iq(n−1).

After the completion of S26, the process is finished once.

Figure 5A:
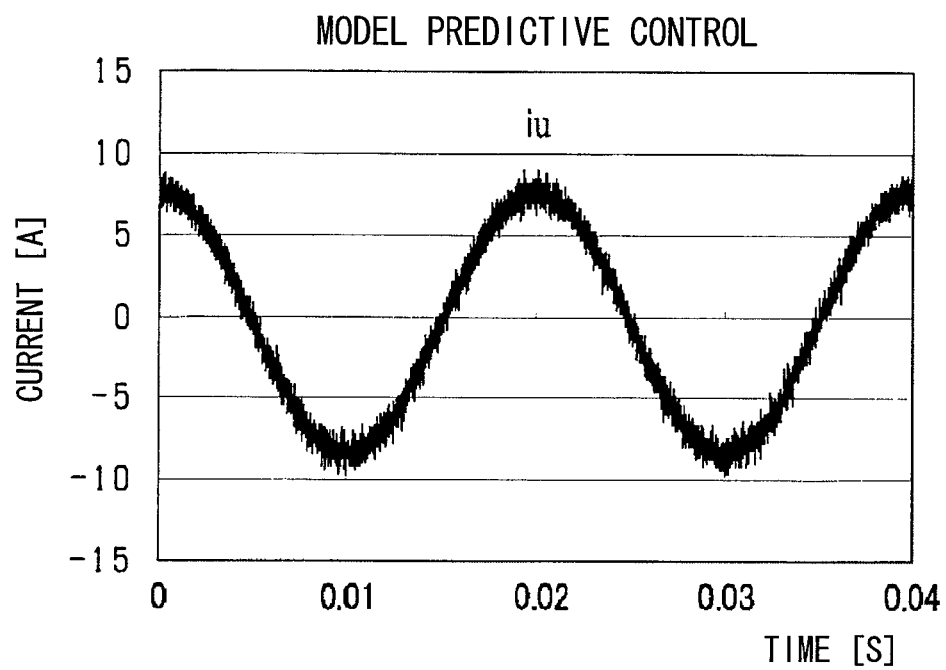
FIGS. 5A and 5B are diagrams illustrating time charts for explaining an advantageous effect of the first embodiment.
Figure 5B:
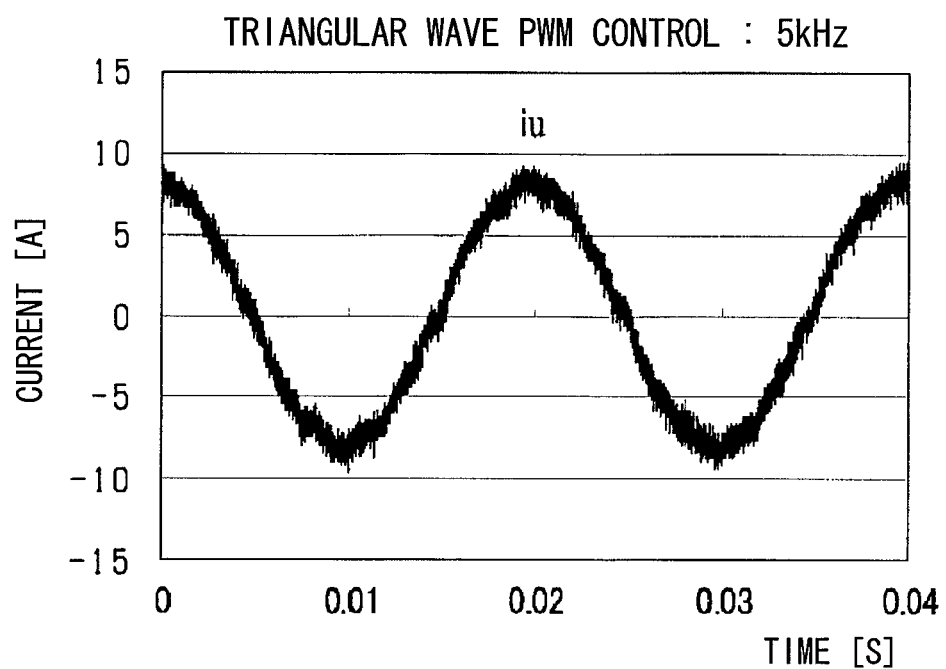

FIG. 5A is a diagram illustrating behavior of the electric current of the U-phase according to the present embodiment, and FIG. 5B is a diagram illustrating behavior of the electric current of the U-phase provided by a known triangular wave PWM control. In this case, a carrier cycle of the triangular wave PWM signal is 5 kHz. The control cycle Tc of the model predictive control is set to a value that enables the switching of the on and off states similar to the switching by the triangular wave PWM control having the carrier cycle of 5 kHz. As shown in FIGS. 5A and 5B, the behavior of the electric current does not have large difference between the model predictive control and the triangular wave PWM control.

Figure 6A:
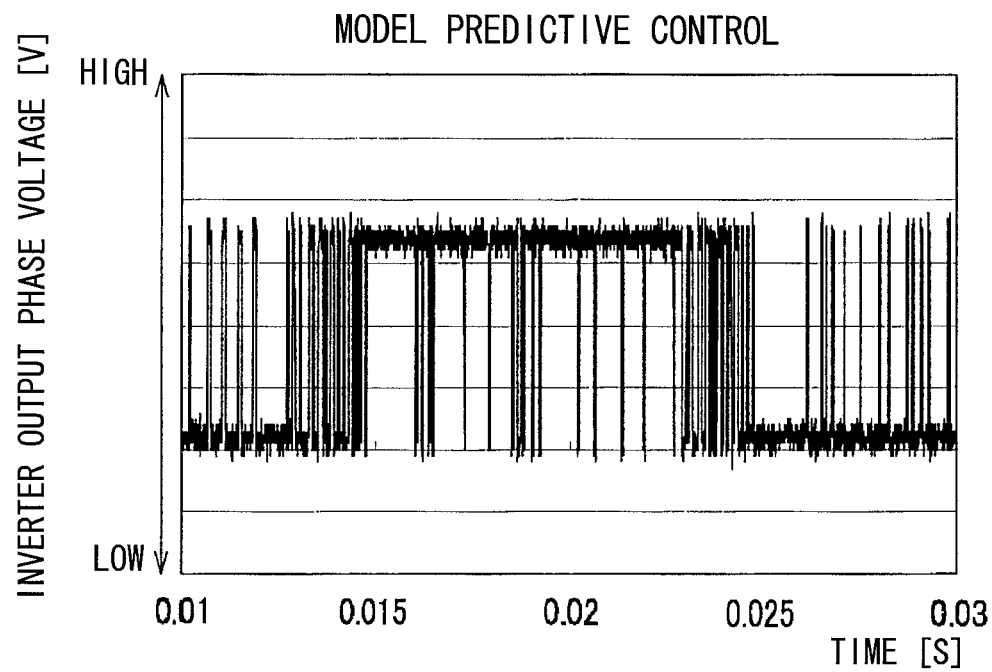
FIGS. 6A and 6B are diagrams illustrating time charts for explaining an advantageous effect of the first embodiment.
Figure 6B:
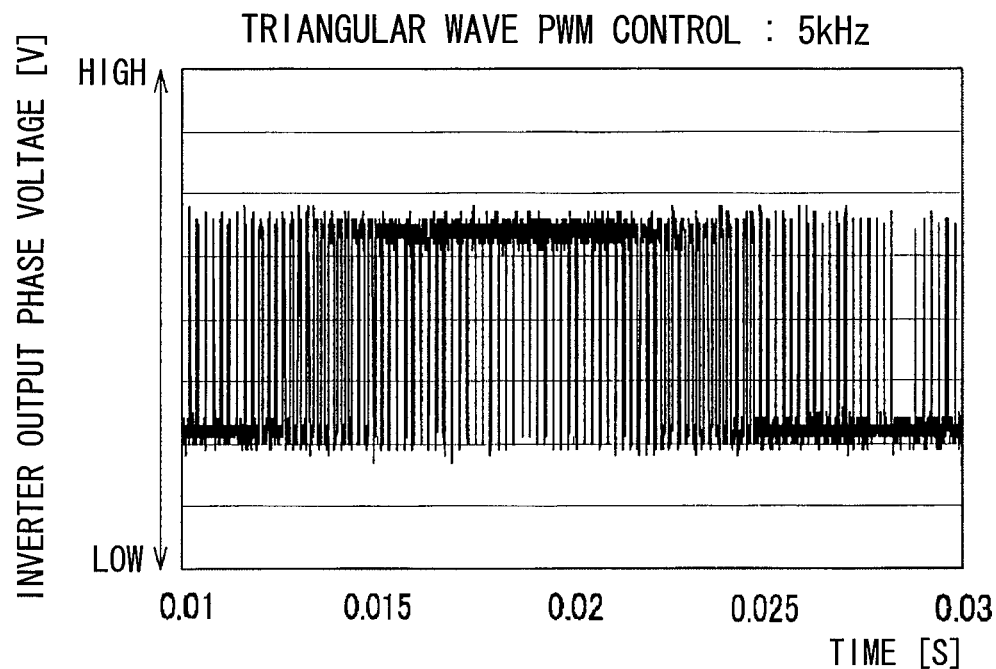

FIG. 6A is a diagram illustrating a change in inverter output voltage of the U-phase according to the present embodiment, and FIG. 6B illustrates a change in inverter output voltage of the U-phase provided by the triangular wave PWM control. In FIGS. 6A and 6B, the voltage is at a lower side when the switching element Sup is in an off state and the switching element Sun is in an on state, and is at a higher side when the switching element Sup is in an on state and the switching element sun is in an off state.

Figure 7:
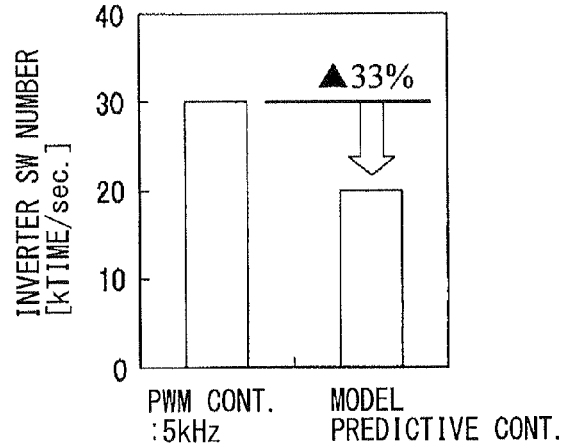
FIG. 7 is a diagram illustrating a graph for explaining an advantageous effect of the first embodiment.

As shown in FIGS. 6A and 6B, in the present embodiment, the switching frequency of the on and off state of the switching element Su# (#=p, n) is reduced, as compared with that provided by the triangular wave PWM control. In fact, as shown in FIG. 7, it is appreciated that the number of switching time of the present embodiment is reduced by 33% from that provided by the triangular wave PWM control.

Further, it is confirmed by the inventor that the switching frequency of the present embodiment is smaller than that of the triangular wave PWM control when the absolute value of the phase current i* is large. The absolute value of the phase current i* is large when power loss due to the switching of the on and off state of the switching element S*#. Therefore, in the present embodiment, the reduction effect of the power loss is large considering the reduction of the number of switching time.

In the present embodiment, the following advantageous effects are achieved.

(1) The operation state of the inverter IV is determined based on the change rate ΔIdqe(n+2) of the predictive currents ide, iqe. In this case, the operation state is determined while evaluating the operation state where the time period required to largely separate the actual currents id, iq from the command currents idr, iqr increases at a higher rate. As a result, the switching frequency of the on and off state is reduced.

(2) Evaluation increases as the change rate ΔIdqe(n+2) reduces. In this case, the operation state that is suitable to reduce the switching frequency of the on and off state is evaluated at a higher rate.

(3) The operation state having the smallest change rate ΔIdqe(n+2) is determined as the operation state of the inverter IV on condition that the error edq(n+2) is equal to or less than the threshold value eth. In this case, evaluation of the operation states is performed while realizing both the evaluation of the error edq(n+2) and the evaluation of the change rate ΔIdqe(n+2).

Second Embodiment

A second embodiment will be described with reference to FIG. 8. Hereinafter, a structure different from the first embodiment will be mainly described.

In the second embodiment, the evaluation of the temporarily set operation states is differentiated depending on a sign of the change rate of the predictive currents ide, iqe.

Figure 8:
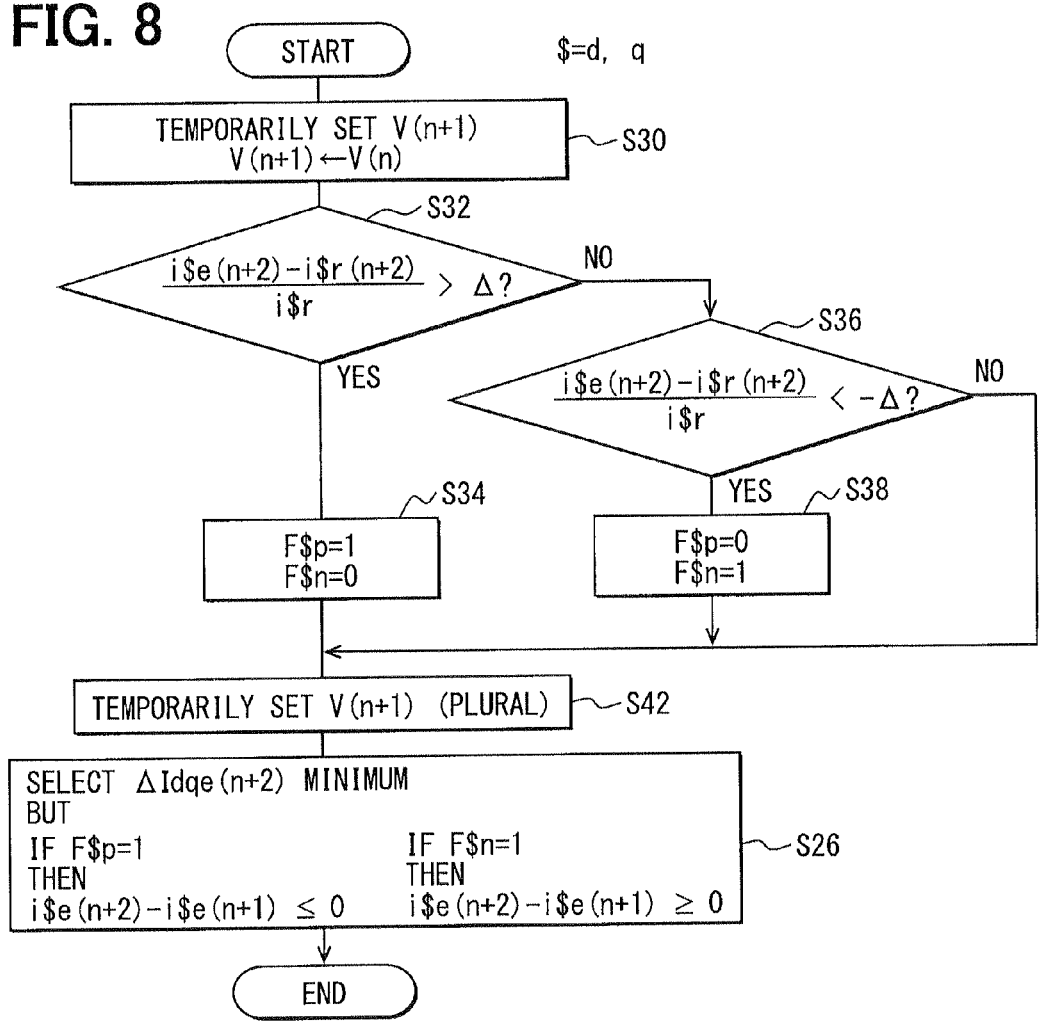
FIG. 8 is a diagram illustrating a flow of a model predictive process performed by a control unit according to a second embodiment.

FIG. 8 is a diagram illustrating a flow of process performed by the operation state determining section 34 according to the second embodiment. The process is repeatedly performed, for example, with a predetermined cycle.

At S30, the voltage vector V(n+1) of the next time is temporarily set to a voltage vector same as the voltage vector V(n) of this time. At S32, it is determined whether a divided value obtained by dividing a subtracted value of the command current i$r(n+2) from the predictive current i$e(n+2) by the command current i$r(n+2) is greater than a predetermined value Δ or not ($=d, q). (i.e., [i$e(n+2)−i$r(n+2)]/i$r>Δ?) The step of S32 is performed in order to determine whether a situation where the actual current i$ largely exceeds the command current i$r will occur due to the voltage vector V(n) of this time being continuously used in the next time.

When the determination result at S32 is "Yes", an over flag F$p is set to "1" and an under flag F$n is set to "0" at S34. When the determination result at S32 is "No", the process proceeds to S36.

At S36, it is determined whether the divided value obtained by dividing a subtracted value of the command current i$r(n+2) from the predictive current i$e(n+2) by the command current i$r(n+2) is lower than a predetermined value −Δ or not ($=d, q). (i.e., [i$e(n+2)−i$r(n+2)]/i$r<−Δ?). The step of S36 is performed in order to determine whether a situation where the actual current i$r largely decreases from the command current i$r will occur or not due to the voltage vector V(n) of this time being continuously used in the next time.

When the determination result at S36 is "Yes", the over flag F$p is set to "0" and an under flag F$n is set to "1" at S38.

After the completion of S34 and S38, or when the determination result at S36 is "No", the voltage vector V(n+1) of the next time is temporarily set at S42. In this case, all the voltage vectors having the switching phase number of the on- and off state of equal to or lower than "one" are included as the temporarily set voltage vector.

At S44, the voltage vector that has the smallest change rate ΔIdqe(n+2) is selected. However, in a case where the over flag F$p is "1", of the temporarily set voltage vectors, the voltage vector in which a value obtained by subtracting the predictive current i$e(n+1) from the predictive current i$e(n+2) is equal to or less than zero is selected. This selection is performed in order to increase evaluation of the voltage vector that could solve the situation where the actual current i$ largely exceeds the command current i$r and to select this voltage vector.

In a case where the under flag F$n is "1", of the temporarily set voltage vectors, the voltage vector in which the value obtained by subtracting the predictive current i$e(n+1) from the predictive current i$e(n+2) is equal to or greater than zero is selected. This selection is performed in order to increase evaluation of the voltage vector that could solve the situation where the actual current i$ decreases smaller than the command current i$r, and to select this voltage vector.

After the completion of S44, the process is finished once.

According to the above described second embodiment, the following advantageous effect will be achieved in addition to the advantageous effect in accordance with the above described effect (1) of the first embodiment.

(4) Based on the sign of the difference between the predictive current ide, iqe and the command current idr, iqr, evaluation of one of the pair of signs of the change rate of the predictive current ide, iqe is increased higher than the other. Therefore, in the case where the same voltage vector is used, the time period required to largely separate the actual currents id, iq from the predictive currents ide, iqe can be increased as long as possible.

Third Embodiment

A third embodiment will be described with reference to FIG. 9. Hereinafter, a structure different from the first embodiment will be mainly described.

In the third embodiment, the torque and the magnetic flux are direct control amounts, and the operation state of the inverter IV is determined based on command values and predictive values of the torque and the magnetic flux.

Figure 9:
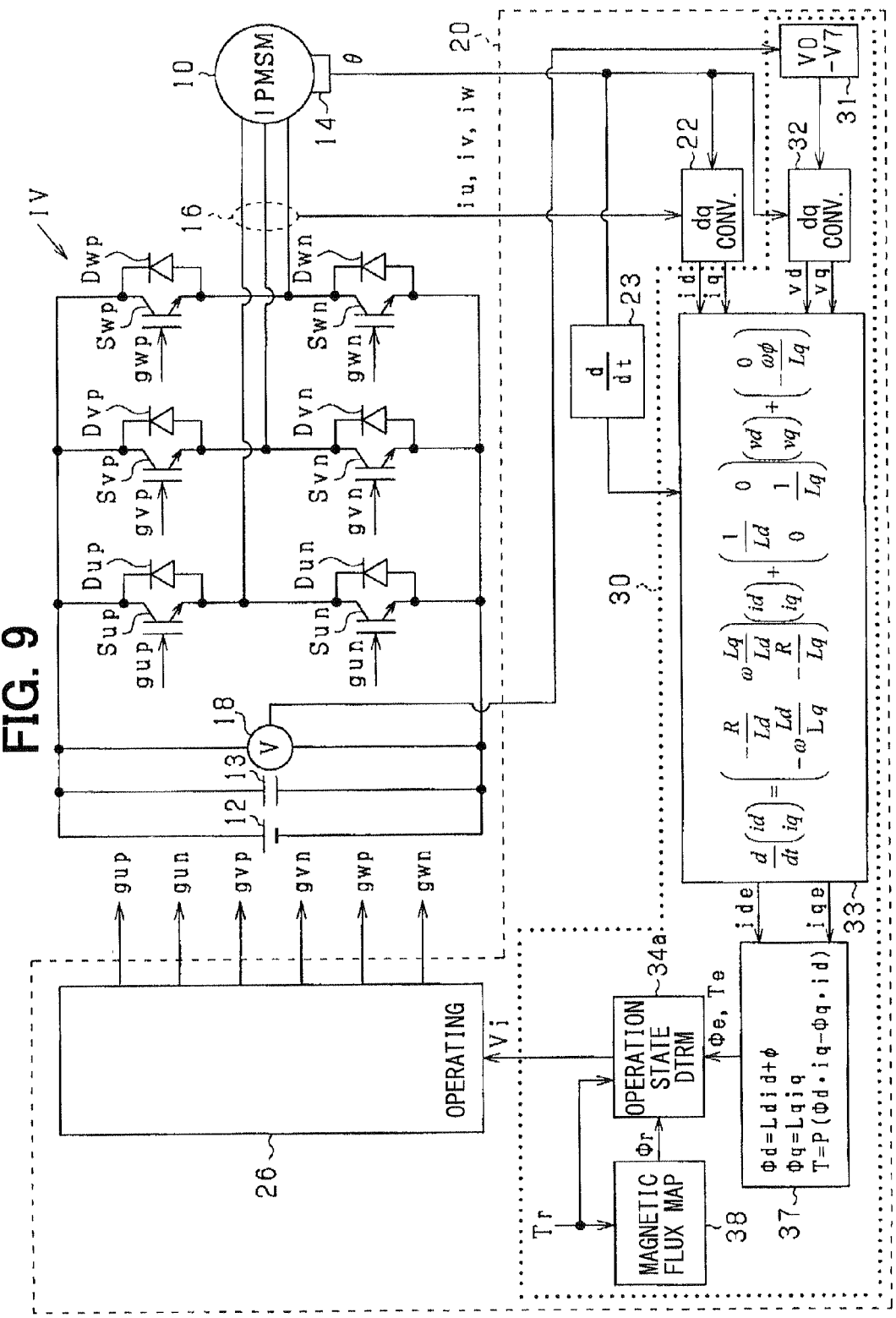
FIG. 9 is a diagram illustrating a system structure of a control unit of a motor generator according to a third embodiment.

FIG. 9 is a diagram illustrating a system structure according to the third embodiment. In FIG. 9, parts and steps corresponding to those of the first embodiment shown in FIG. 1 will designated by like reference symbols.

A torque and magnetic flux predicting section 37 predicts a magnetic flux vector Φ and a torque T of the motor generator 10 based on the predictive currents ide, iqe. The magnetic flux vector Φ=(Φd, Φq) is predicted by the following equations (c5) and (c6), and the torque T is predicted by the following equation (c7).

$$\Phi d = Ld \cdot id + \phi \quad (c5)$$

$$\Phi q = Lq \cdot iq \quad (c6)$$

$$T = P(\Phi d \cdot iq - \Phi q \cdot id) \quad (c7)$$

In the equation (c7), P is the number of pole pairs.

A magnetic flux map section 38 determines a command magnetic flux vector Φr based on the required torque Tr. The command magnetic flux vector Φr is set to a magnetic flux vector that satisfies the required torque Tr and a requirement such as to realize a maximum torque control that achieves a maximum torque with a minimum electric current.

At an operation state determining section 34a, in a case where quantified values of all the voltage vectors are greater than a threshold value, the voltage vector having the smallest quantified value is used. Here, the quantified value is a value quantified based on a difference between a predictive torque Te and the required torque Tr and a difference of respective components of a predictive magnetic flux vector Φe and the command magnetic flux vector Φr. Specifically, the quantification is determined by the sum of values that are obtained by multiplying each of the squares of these differences by a weighting factor $\alpha$, $\beta$ ($\alpha \neq \beta$, $\alpha \neq 0$, $\beta \neq 0$).

In such a case, the weighting factors $\alpha$, $\beta$ are used considering that the degree of the torque and the degree of the magnetic flux are different. For example, when units of the torque and magnetic flux are determined so that the value of the torque is greater than that of the magnetic flux, torque deviation is likely to be greater than magnetic flux deviation. If the weighting factors $\alpha$, $\beta$ are not used, a drawback such as the evaluation is not sufficiently reduced even in a voltage vector having low magnetic flux controllability may arise. Therefore, the weighting factors $\alpha$, $\beta$ are used as means to compensate a difference of degree of the absolute values of multiple input parameters for evaluation.

On the other hand, in a case where any of the voltage vectors have the quantified value equal to or lower than the threshold, the voltage vector having a smallest sum of a change rate of the predictive torque Te and a change rate of a predictive magnetic flux vector Φe is used.

Other Embodiments

The above described embodiments will be modified in the following manners.

(Determining Section)

In the first embodiment, of the voltage vectors having the error edq(n+2) of equal to or less than the threshold value eth, the voltage vector having the smallest change rate ΔIdqe(n+2) is selected. Alternative to the voltage vector having the smallest change rate ΔIdqe(n+2), the voltage vector having a smallest weighted average processed value "$\alpha \cdot edq(n+2) + \beta \cdot \Delta Idq(n+2)$" of the error edq(n+2) and the change rate ΔIdqe(n+2) may be selected.

In the first embodiment, in a case where the last error edq(n+1) is sufficiently different from the threshold value eth, an operation state that makes the change rate ΔIdqe(n+2) minimum may be selected without evaluating the error edq(n+2) of this time.

In the second embodiment, with regard to the operation states to be selected, a requirement that an operation state corresponds to the voltage vector having the error edq(n+2) of equal to or less than the threshold value eth may be further added.

The determination is not limited to the determination that refers to only the prediction result according to the voltage vector V(n+1) at a next renewal timing (i.e., renewal timing of one control cycle ahead) as described in the following "relative rate predicting section".

(Relative Rate Predicting Section)

Prediction of the relative rate is not limited to the prediction based on the difference between the predictive current Idq(n+1) as the electric current value in renewing the next voltage vector V(n+1) and the predictive current Idq(n+2) as the electric current value caused by the voltage vector V(n+1). For example, according to the above equations (c3), (c4), a change rate of the electric current of the d-axis and a change rate of the electric current of the q-axis caused by the voltage vector V(n+1) can be calculated based on the predictive current Idq(n+1) and the voltage vector V(n+1). Therefore, the change rate may be calculated based on these values.

For example, in the case the determining section is configured not to calculate the error edq(n+2) of this time on condition that the error edq(n+1) of the last time is sufficiently different from the threshold value eth, the operation state may be determined without calculating the predictive current idq(n+2).

The prediction of the relative rate is not limited to prediction of the change rate of the electric current caused by the next voltage vector V(n+1). For example, in a configuration of sequentially predicting the control amount given by the operation of the inverter IV up to a renewing timing of several control cycles ahead, an average of the relative rates thereof may be predicted. In such a case, for example, the determining section may select the voltage vector having the smallest average rate.

The prediction of the relative rate may be achieved based on the relative rate of the command current idr, iqr and the predictive current ide, iqe. Here, the change rate of the command current idr, iqr corresponds to a difference between the command current idr(n+2), iqr(n+2) and the command current idr(n+1), iqr(n+1). The relative rate vector corresponds to the vector provided by the difference between the change rate of the command current idr, iqr and the change rate of the predictive current ide, iqe. In the first embodiment, in a case where the above described change rate $\Delta$Idqe(n+2) is replaced with the norm of the relative rate vector, if the command current idr, iqr does not change, the process becomes mathematically equivalent to the process of the first embodiment described above.

(Quantification of the Relative Rate)

For example, in the first embodiment, a weighted average processing value of an absolute value of a difference between the predictive current ide(n+2) and the predictive current ide(n+1) and an absolute value of a difference between the predictive current iqe(n+2) and the predictive current iqe(n+1) may be used as a parameter of the evaluation of the relative rate (change rate).

Namely, the relative rate may be quantified by a parameter that has a positive or negative correlation with the relative rate so as to quantify that the evaluation reduces as the relative rate increases.

(Parameter to Evaluate Deviation Between the Control Amount and the Command Value Thereof)

In the first embodiment, the weighting average processing value of an absolute value of a difference between the predictive current ide(n+2) and the command current idr(n+2) and an absolute value of a difference between the predictive current iqe(n+2) and the command current iqr(n+2) may be used as a parameter for evaluating the degree of deviation. Namely, quantification is made by a parameter having a positive or negative correlation with the degree of deviation so as to quantify that the evaluation is lowered with an increase in the degree of deviation.

(Threshold Value eth)

The threshold value eth is not limited to a variable value that is determined in accordance with the required torque Tr, the electric angular velocity $\omega$, and the power supply voltage VDC. For example, the threshold value eth may be a variable value that is determined in accordance with one or two of the required torque Tr, the electric angular velocity $\omega$, and the power supply voltage VDC. In place of the required torque Tr, an estimation torque estimated based on the actual currents id, iq may be used. In place of the required torque Tr, the actual currents id, iq and/or the command currents idr, iqr may be used.

The threshold value eth may be a fixed value. In this case, an object to be compared with the threshold value eth is preferably an error that is normalized by an absolute value of the control amount (e.g., a ratio of a norm of an error vector to a norm of a command current vector).

(Temporarily Set Operation State)

The operation state to be temporarily set is not limited to the operation state having the switching phase number of equal to or less than "one". The temporarily set operation state may be the operation state having the switching phase number of equal to or less than "two". Further, the temporarily set operation state may be all of the voltage vectors V0 to V7.

(Control Amount)

The control amount used for determining the operation state of the inverter IV based on the command value and the predictive value is not limited to the torque and magnetic flux or the electric current. For example, the control amount may be only a torque or only a magnetic flux. As another example, the control amount may be a torque and an electric current. In a case where the control amount is other than the electric current, a detection target to be directly detected by a sensor may be other than the electric current.

In the above embodiments, the ultimate control amount of the rotary device (i.e., the control amount that is required to be ultimately controlled to a desired amount regardless of whether a prediction target or not) is exemplarily the torque. Alternatively, the ultimate control amount of the rotary device may be a rotation speed or the like.

(Others)

The rotary device is not limited to the interior permanent magnet synchronous motor, but may be other synchronous machines, such as a surface magnet synchronous machine, a field winding type synchronous machine or the like. Further, the rotary device is not limited to synchronous machines, but may be an induction rotating machine, such as an induction motor.

The rotary device is not limited to an in-vehicle device mounted in a hybrid vehicle, but may be an in-vehicle device mounted in an electric vehicle. Further, the rotary device is not limited to a device used as a main component of a vehicle.

A DC voltage supply is not limited to the high-voltage battery 12, but may be an output terminal of a converter that increases the voltage of the high-voltage battery 12.

In the above embodiments, the inverter IV is employed as an example of a power converting circuit that includes switching element for connecting and disconnecting between a voltage applying section applying multiple different voltage values and terminals of the rotary device. However, the power converting circuit is not limited to the inverter IV. For example, the power converting circuit may include switching elements that selectively connecting and disconnecting between a voltage applying section applying voltages at three or more different values to each phase of a multi-phase rotary device and terminals of the rotary device. An example of the power converting circuit for applying voltages at three or more different values to terminals of the rotary device is known in JP2006-174697A.

While only the selected example embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the example embodiments according to the present disclosure is provided for illustration only, and not for the purpose of limiting the disclosure as defined by the appended claims and their equivalents.

What is claimed is:

1. A control unit of a rotary device, the control unit controlling a control amount of the rotary device by controlling on and off states of switching elements of a power converting circuit, the control amount being at least one of an electric current flowing in the rotary device, a torque of the rotary device, and a magnetic flux of the rotary device, the switching elements connecting and disconnecting between a voltage applying unit having multiple different voltage values and terminals of the rotary device, the control unit comprising:

a relative rate predicting section that is configured to:

temporarily set operation states for a next control cycle of the power converting circuit, each of the temporarily set operation states being indicated by a voltage vector defined by the on and off states of the switching elements and having a switching phase number of equal to or less than two from a current operation state of the power converting circuit as operation states for a next control cycle, and predict relative rates each defined based on a difference between a first change rate and a second change rate, the first change rate being a rate of change of a command value of the control amount in one control cycle, the second change rate being a rate of change of the control amount in one control cycle predicted according to each temporarily set operation state;

a determining section that is configured to:

evaluate the temporarily set operation states with regard to an absolute value of the relative rate so that the temporarily set operation state indicating a smallest absolute value of the relative rate has a highest evaluation rate, and determine the temporarily set operation state indicating the highest evaluation rate as an operation state of the power converting circuit; and an operating section configured to operate the power converting circuit to the operation state determined by the determining section.

2. The control unit according to claim 1, wherein the relative rate predicting section is configured to use the second change rate of the control amount for the relative rate.

3. The control unit according to claim 1, further comprising a control amount predicting section configured to predict control amounts realized by the temporarily set operation states, wherein the determining section is configured to determine the operation state having the highest evaluation rate as the operation state to be used by the operating section, on condition that a difference between at least one of the predicted control amounts and the command value is equal to or less than a threshold level.

4. The control unit according to claim 3, wherein in a case where the difference between the predicted control amount and the command value of all the temporarily set operation states is greater than the threshold level, the determining section is configured to determine the operation state having a minimum difference as the operation state to be used by the operating section.

5. The control unit according to claim 1, wherein the determining section is configured to evaluate, among the temporarily set operation states, the temporarily set operation state indicating a negative relative rate to have a higher evaluation rate than the temporarily set operation state indicating a positive relative rate on condition that the control amount predicted for two control cycles ahead is greater than the command value of the control amount of the two control cycles ahead, and the determining section is configured to evaluate, among the temporarily set operation states, the temporarily set operation state indicating a positive relative rate to have a higher evaluation rate than the temporarily set operation state indicating a negative relative rate on condition that the control amount predicted for two control cycles ahead is smaller than the command value of the control amount of the two control cycles ahead.

6. The control unit according to claim 1, wherein the power converting circuit includes a DC/AC converting circuit having switching elements each selectively connecting the respective terminal of the rotary device to corresponding one of a positive terminal and a negative terminal of a DC power supply.

* * * * *